United States Patent
Breese

(10) Patent No.: US 7,078,081 B2
(45) Date of Patent: Jul. 18, 2006

(54) PREPARATION OF POLYETHYLENE FILMS

(75) Inventor: D. Ryan Breese, Loveland, OH (US)

(73) Assignee: Equistar Chemicals, LP, Houston, TX (US)

( * ) Notice: Subject to any disclaimer, the term of this patent is extended or adjusted under 35 U.S.C. 154(b) by 0 days.

(21) Appl. No.: 11/117,123

(22) Filed: Apr. 28, 2005

(65) Prior Publication Data
US 2005/0197459 A1    Sep. 8, 2005

Related U.S. Application Data

(62) Division of application No. 10/767,940, filed on Jan. 29, 2004, now Pat. No. 7,011,892.

(51) Int. Cl.
*B29D 7/01*  (2006.01)
*B32B 27/32*  (2006.01)

(52) U.S. Cl. .................. 428/36.92; 428/523; 526/348; 526/352

(58) Field of Classification Search ............. 428/36.92, 428/523; 526/348, 352
See application file for complete search history.

(56) References Cited

U.S. PATENT DOCUMENTS 6,458,910 B1 * 10/2002 Firdaus et al. ............... 526/348

* cited by examiner

*Primary Examiner*—Caixia Lu
(74) *Attorney, Agent, or Firm*—Shao-Hua Guo

(57) ABSTRACT

An essentially transparent, high density polyethylene film is disclosed. The film has a haze of 20% or less, a gloss of 40% or greater, and density within the range of 0.935 to 0.948 g/cc. The film is made by a high-stalk blown extrusion process and then uniaxially oriented in the machine direction.

9 Claims, No Drawings

PREPARATION OF POLYETHYLENE FILMS

This application is a divisional application of U.S. application Ser. No. 10/767,940, filed Jan. 29, 2004, now U.S. Pat. No. 7,011,892.

FIELD OF THE INVENTION

The invention relates to polyethylene films. More particularly, the invention relates to polyethylene films which have high density and high transparency.

BACKGROUND OF THE INVENTION

Polyethylene is divided into high-density (HDPE, density 0.941 g/cc or greater), medium-density (MDPE, density from 0.926 to 0.940 g/cc), low-density (LDPE, density from 0.910 to 0.925 g/cc), and linear low-density polyethylene (LLDPE, density from 0.910 to 0.925 g/cc). (See ASTM D4976-98: Standard Specification for Polyethylene Plastic Molding and Extrusion Materials.)

One of the main uses of polyethylene (HDPE, LLDPE, and LDPE) is in film applications, such as grocery sacks, institutional and consumer can liners, merchandise bags, shipping sacks, food packaging films, multi-wall bag, liners, produce bags, deli wraps, stretch wraps, and shrink wraps. The key physical properties of polyethylene film include tear strength, impact strength, tensile strength, stiffness and transparency. Overall film strength is desirable so that the films may be employed with confidence in various applications. Film transparency is desirable because a transparent film allows the users to see inside the bag without opening it. While HDPE films have superior strength, toughness and puncture resistance, they have low transparency and low gloss.

Machine direction orientation (MDO) is known to the polyolefin industry. When a polymer is strained under uniaxial stress, the orientation becomes aligned in the direction of pull. Most commercial MDO films are produced by orienting cast extrusion films. When an HDPE film undergoes MDO, the resultant film usually shows improved gloss and transparency. However, the improvement is very limited and the MDO films remain opaque.

Other ideas to improve film gloss and transparency are also known. For instance, U.S. Pat. No. 5,989,725 teaches a multilayered film of which at least one layer is an HDPE. The multilayered film shows increased transparency and gloss. However, the multilayered film is usually more costly than a single-layer film. Further, the claimed multilayered film still has a high haze and low gloss compared to LLPDE films. Similarly, European Patent Application EP 0246328 teaches a transparent film made from a blend of HDPE and LLDPE.

It would be desirable to prepare a polyethylene film which has a physical strength like HDPE film but transparency and gloss like LLDPE film. It is more desirable to prepare a transparent polyethylene film without using multiple layers or blending two or more different resins.

SUMMARY OF THE INVENTION

The invention is a polyethylene film. The film has a haze of 20% or less, a gloss of 40% or greater, and density within the range of 0.935 to 0.948 g/cc. The film is made by a high-stalk blown extrusion process and then uniaxially oriented in the machine direction. Unlike the known HDPE films, the polyethylene film of the invention has a high density and high physical strength, and it is essentially transparent.

The invention also includes a method for making the film. The method comprises converting a polyethylene, which has a density within the range of 0.935 to 0.948 g/cc and an $MI_2$ within the range of 0.03 to 0.15 dg/min, into a film by a high-stalk blown extrusion and then orienting the film uniaxially in the machine direction. The oriented film is essentially transparent with a haze of 20% or less and a gloss of 40% or greater. Unlike the methods unknown in the art, the method of the invention does not require the use of multiple layers or blend of two or more resins.

DETAILED DESCRIPTION OF THE INVENTION

Polyethylene resin suitable for making the film of the invention has a density within the range of about 0.935 to about 0.948 g/cc. Preferably, the density is within the range of about 0.939 to about 0.945 g/cc. More preferably, the density is within the range of 0.939 to 0.941 g/cc.

Preferably, the polyethylene resin has a melt index $MI_2$ from about 0.03 to about 0.15 dg/min, more preferably from about 0.04 to about 0.15 dg/min, and most preferably from 0.05 to 0.10. The $MI_2$ is measured at 190° C. under 2.16 kg of pressure according to ASTM D-1238.

Preferably, the polyethylene resin has a number average molecular weight (Mn) within the range of about 10,000 to about 25,000, more preferably from about 12,000 to about 20,000, and most preferably from about 14,000 to about 18,000. Preferably, the polyethylene resin has a weight average molecular weight (Mw) within the range of about 100,000 to about 250,000, more preferably from about 150,000 to about 250,000, and most preferably from about 150,000 to about 200,000. Preferably, the polyethylene resin has a molecular weight distribution (Mw/Mn) within the range of about 5 to about 20, more preferably from about 5 to about 15, and most preferably from about 8 to about 15.

The Mw, Mn and Mw/Mn are obtained by gel permeation chromatography (GPC) on a Waters GPC2000CV high temperature instrument equipped with a mixed bed GPC column (Polymer Labs mixed B-LS) and 1,2,4-trichlorobenzene (TCB) as the mobile phase. The mobile phase is used at a nominal flow rate of 1.0 mL/min and a temperature of 145° C. No antioxidant is added to the mobile phase, but 800 ppm BHT is added to the solvent used for sample dissolution. Polymer samples are heated at 175° C. for two hours with gentle agitation every 30 minutes. Injection volume is 100 microliters.

The Mw and Mn are calculated using the cumulative matching % calibration procedure employed by the Waters Millenium 4.0 software. This involves first generating a calibration curve using narrow polystyrene standards (PSS, products of Waters Corporation), then developing a polyethylene calibration by the Universal Calibration procedure.

Preferably, the polyethylene resin is a copolymer that comprises from about 85 wt % to about 98 wt % of recurring units of ethylene and from about 2 wt % to about 15 wt % of recurring units of a $C_3$ to $C_{10}$ α-olefin. Suitable $C_3$ to $C_{10}$ α-olefins include propylene, 1-butene, 1-pentene, 1-hexene, 4-methyl-1-pentene, and 1-octene, and the like, and mixtures thereof.

Suitable polyethylene resins can be produced by Ziegler catalysts or newly developed single-site catalysts. Ziegler catalysts are well known. Examples of suitable Ziegler catalysts include titanium halides, titanium alkoxides, vanadium halides, and mixtures thereof. Ziegler catalysts are used with cocatalysts such as alkyl aluminum compounds.

Single-site catalysts can be divided into metallocene and non-metallocene. Metallocene single-site catalysts are transition metal compounds that contain cyclopentadienyl (Cp) or Cp derivative ligands. For example, U.S. Pat. No. 4,542,199, the teachings of which are incorporated herein by reference, teaches metallocene catalysts. Non-metallocene single-site catalysts contain ligands other than Cp but have the same catalytic characteristics as metallocenes. The non-metallocene single-site catalysts may contain heteroatomic ligands, e.g., boraaryl, pyrrolyl, azaborolinyl or quinolinyl. For example, U.S. Pat. Nos. 6,034,027, 5,539,124, 5,756,611, and 5,637,660, the teachings of which are incorporated herein by reference, teach non-metallocene catalysts.

The polyethylene is converted into a thick film by a high-stalk blown extrusion process. High-stalk blown film process is known. For instance, U.S. Pat. No. 4,606,879, the teachings of which are herein incorporated by reference, teaches high-stalk blown film extrusion apparatus and method. The process temperature is preferably within the range of about 150° C. to about 210° C. The thickness of the film is preferably within the range of about 3 to about 12 mils, more preferably within the range of about 6 to about 8 mils.

The film is then uniaxially stretched in the machine (or processing) direction to a thinner film. The ratio of the film thickness before and after orientation is called "draw-down ratio." For example, when a 6-mil film is stretched to 1-mil, the draw-down ratio is 6:1. Preferably, the draw-down ratio is such that the film is at or near maximum extension. Maximum extension is the draw-down film thickness at which the film cannot be drawn further without breaking. The film is said to be at maximum extension when machine direction (MD) tensile strength has a less than 100% elongation at break under ASTM D-882.

During the MDO, the film from the blown-film line is heated to an orientation temperature. Preferably, the orientation temperature is between 60% of the difference between the glass transition temperature (Tg) and the melting point (Tm) and the melting temperature (Tm). For instance, if the blend has a Tg of 25° C. and a Tm of 125° C., the orientation temperature is preferably within the range of about 60° C. to about 125° C. The heating is preferably performed utilizing multiple heating rollers.

Next, the heated film is fed into a slow draw roll with a nip roller, which has the same rolling speed as the heating rollers. The film then enters a fast draw roll. The fast draw roll has a speed that is 2 to 10 times faster than the slow draw roll, which effectively stretches the film on a continuous basis.

The stretched film then enters annealing thermal rollers, which allow stress relaxation by holding the film at an elevated temperature for a period of time. The annealing temperature is preferably within the range of about 100° C. to about 125° C. and the annealing time is within the range of about 1 to about 2 seconds. Finally, the film is cooled through cooling rollers to an ambient temperature.

The film of the invention is essentially transparent. By "essentially transparent," I mean that the film has a haze of 20% or less. The haze is tested according to ASTM D1003-92: Standard Test Method for Haze and Luminous Transmittance of Transparent Plastics, October 1992. Preferably, the haze is 15% or less. More preferably, the haze is 13% or less.

The film of the invention has a high gloss. By "high gloss," I mean that the gloss is about 40% or greater. The gloss is tested according to ASTM D 2457-90: Standard Test Method for Specular Gloss of Plastic Films and Solid Plastics, June 1990. Preferably, the gloss is about 50% or greater.

The film of the invention remains at a high physical strength. Preferably, the oriented film has MD modulus greater than or equal to 240,000 psi, MD tensile strength at yield greater than or equal to 7,000 psi, MD elongation at yield greater than or equal to 3%, MD tensile strength at break greater than or equal to 30,000 psi, and MD elongation at break greater than or equal to 40%. Preferably, the oriented film has TD (transverse direction) modulus greater than or equal to 210,000 psi, TD tensile strength at yield greater than or equal to 4,000 psi, TD elongation at yield greater than or equal to 4%, TD tensile strength at break greater than or equal to 4,000 psi, and TD elongation at break greater than or equal to 700%. Tensile strength is tested according to ASTM D-882. Modulus is tested according to ASTM E-111-97.

Surprisingly, I found that the machine direction orientation of polyethylene films which are made by an in-pocket film process gives much lower gloss and much higher haze. For instance, the MDO, high-stalk polyethylene films can have a haze of 20% or lower and a gloss of 40% or higher (see Examples 1–6 and 9–16), while the MDO, in-pocket films made from the same polyethylene resins have much higher haze and much lower gloss (see Comparative Examples 7, 8, and 17–23).

Both high-stalk and in-pocket processes are commonly used for making polyethylene films. The difference between the high-stalk process and the in-pocket process is that in the high-stalk process, the extruded tube is inflated a distance (i.e., the length of the stalk) from the extrusion die, while the extruded tube in the in-pocket process is inflated as the tube exits the extrusion die.

In addition, I found that the densities of the polyethylene resins are also determinative for the haze and gloss of the MDO films. For instance, Comparative Examples 24–26 show that when the polyethylene resin has a density of 0.949 g/cc or higher, the MDO films have a haze which is greater than 20% and a gloss which is lower than 20% at their maximum draw-down ratios (see Table 5).

The following examples merely illustrate the invention. Those skilled in the art will recognize many variations that are within the spirit of the invention and scope of the claims.

EXAMPLES 1–6

MDO, High Density and High-stalk Polyethylene Films

A high density polyethylene (XL3810, product of Equistar Chemicals, LP, $MI_2$: 0.12 dg/min, density: 0.940 g/cc, Mn: 16,000, Mw: 175,000, and Mw/Mn: 11) is converted into films with a thickness of 6.0 mil on 200 mm die with 2 mm die gap. The films are produced at a stalk height of 8 die diameters and at blow-up ratios (BUR) of 4:1.

The films are then stretched into thinner films in the machine direction with draw-down ratios 1, 2, 3, 4, 5, and 6.5 in Examples 1–6, respectively. When the draw-down ratio is 1:1, the film is not oriented. The draw-down ratio of 6.5:1 is the maximum draw-down ratio. The film properties are listed in Table 1.

TABLE 1

Properties vs. Draw-down Ratio of MDO, High-stalk Films

| Ex. No. | Draw-Down Ratio | Gloss % | Haze % | MD Modulus psi | MD Tensile Elongation @ Break % | MD Tensile Strength @ Break | TD Modulus psi | TD Tensile Elongation @ Break % | TD Tensile Strength @ Break |
|---|---|---|---|---|---|---|---|---|---|
| 1 | 1:1 | 5.1 | 78 | 91,400 | 640 | 4,600 | 98,500 | 660 | 4,640 |
| 2 | 2:1 | 5.6 | 66 | 111,000 | 411 | 10,700 | 141,000 | 758 | 5,216 |
| 3 | 3:1 | 14 | 49 | 131,100 | 245 | 14,900 | 165,600 | 791 | 5,286 |
| 4 | 4:1 | 27 | 32 | 155,000 | 128 | 18,500 | 183,100 | 782 | 5,040 |
| 5 | 5:1 | 39 | 19 | 183,100 | 59 | 22,700 | 196,700 | 755 | 4,664 |
| 6 | 6.5:1 | 51 | 13 | 242,000 | 41 | 32,900 | 214,000 | 730 | 4,270 |

COMPARATIVE EXAMPLES 7–8

MDO, High Density and In-pocket Polyethylene Films

Examples 1–6 are repeated, but the films are made at in-pocket film line. The film properties are listed in Table 2, which shows that the machine direction oriented, in-pocket films have much lower gloss and higher haze than the high-stalk films at their respective maximum draw ratios. The draw-down ratio of 2:1 is the maximum draw-down ratio of the in-pocket films.

TABLE 2

Properties vs. Draw-down Ratios of MDO, In-pocket Films

| Ex. No. | Draw-Down Ratio | Gloss % | Haze % | MD Modulus psi | MD Tensile Elongation @ Break % | MD Tensile Strength @ Break | TD Modulus psi | TD Tensile Elongation @ Break % | TD Tensile Strength @ Break |
|---|---|---|---|---|---|---|---|---|---|
| C7 | 1:1 | 4.7 | 80 | 91,200 | 700 | 5,630 | 103,000 | 710 | 5,520 |
| C8 | 2:1 | 8.7 | 62 | 110,000 | 320 | 11,400 | 142,000 | 770 | 4,800 |

EXAMPLES 9–16

MDO, High Density and High-stalk Polyethylene Films

A high density polyethylene (XL3805, product of Equistar Chemicals, LP, $MI_2$: 0.057 dg/min, density: 0.940 g/cc, Mn: 18,000, Mw: 209,000, and Mw/Mn: 11) is converted into films with a thickness of 6.0 mil on 200 mm die with 2 mm die gap. The films are produced at a stalk height of 8 die diameters and at blow-up ratios (BUR) of 4:1.

The films are then stretched into thinner films in the machine direction with draw-down ratios 1, 2, 3, 4, 5, 7, and 8 in Examples 9–16, respectively. When the draw-down ratio is 1:1, the film is not oriented. The draw-down ratio of 8:1 is the maximum draw-down ratio. The film properties are listed in Table 3.

COMPARATIVE EXAMPLES 24–26

MDO, High-stalk Polyethylene Films of Various Densities and $MI_2$

Three Equistar high density polyethylene resins, XL5906 (density: 0.959 g/cc, $MI_2$: 0.057 dg/min, Mn: 12,900, Mw: 207,000), L4907 (density: 0.949 g/cc, $MI_2$: 0.075 dg/min, Mn: 14,300, Mw: 194,700), and L5005 (density: 0.949 g/cc, $MI_2$: 0.057 dg/min, Mn: 12,600, Mw: 212,000) are converted into films of thickness of 6.0 mil by the high-stalk process described in Examples 1–6. The high-stalk films are then stretched in the machine direction to their maximum draw-down ratios. Listed in Table 5 are the gloss and haze of each oriented film at their maximum draw-down ratios. The table shows that these films have much higher haze and lower gloss than the films of Examples 6 and 16.

TABLE 3

Properties vs. Draw-down Ratios of MDO, High-stalk Films

| Ex. No. | Draw-Down Ratio | Gloss % | Haze % | MD Modulus psi | MD Tensile Elongation @ Break % | MD Tensile Strength @ Break | TD Modulus psi | TD Tensile Elongation @ Break % | TD Tensile Strength @ Break |
|---|---|---|---|---|---|---|---|---|---|
| 9  | 1:1 | 3.9 | 87 | 90,500  | 771 | 6.00   | 90,300  | 730 | 6,700 |
| 10 | 2:1 | 5.1 | 75 | 109,000 | 415 | 9,600  | 135,100 | 770 | 5,800 |
| 11 | 3:1 | 8.3 | 62 | 131,400 | 221 | 14,300 | 161,300 | 710 | 5,200 |
| 12 | 4:1 | 15  | 48 | 158,300 | 126 | 20,200 | 179,900 | 710 | 4,800 |
| 13 | 5:1 | 23  | 36 | 190,800 | 77  | 26,900 | 194,300 | 720 | 4,700 |
| 14 | 6:1 | 33  | 26 | 229,800 | 51  | 34,100 | 206,000 | 730 | 4,700 |
| 15 | 7:1 | 41  | 20 | 276,900 | 36  | 41,700,| 216,000 | 740 | 4,800 |
| 16 | 8:1 | 42  | 20 | 333,700 | 27  | 49,400 | 224,600 | 710 | 4,900 |

COMPARATIVE EXAMPLES 17–23

MDO, High Density and In-pocket Polyethylene Films

Examples 9–16 are repeated, but the films are made at in-pocket film conditions. The film properties are listed in Table 4, which shows that the machine direction oriented, in-pocket films have much lower gloss and higher haze than the high-stalk films at their respective maximum draw ratios. The draw-down ratio of 7:1 is the maximum draw-down ratio of the in-pocket films.

TABLE 5

Film Haze and Gloss vs. Density and $MI_2$ at Maximum Draw-down Ratios

| Ex. No. | Density g/cc | $MI_2$ dg/min | Film Process | MDO Maximum Draw-Down Ratio | Gloss % | Haze % |
|---|---|---|---|---|---|---|
| 6  | 0.940 | 0.12  | High-stalk | 6.5:1 | 51  | 13 |
| C8 | 0.940 | 0.12  | In-pocket  | 2:1   | 8.7 | 62 |
| 16 | 0.940 | 0.057 | High-stalk | 8:1   | 42  | 20 |

TABLE 4

Properties vs. Draw-down Ratios of MDO, In-pocket Films

| Ex. No. | Draw-Down Ratio | Gloss % | Haze % | MD Modulus psi | MD Tensile Elongation @ Break % | MD Tensile Strength @ Break | TD Modulus psi | TD Tensile Elongation @ Break % | TD Tensile Strength @ Break |
|---|---|---|---|---|---|---|---|---|---|
| C17 | 1:1 | 3.3 | 87 | 91,000  | 809 | 4,300  | 96,600  | 690 | 6,100 |
| C18 | 2:1 | 8.6 | 67 | 111,000 | 261 | 11,500 | 139,900 | 760 | 5,500 |
| C19 | 3:1 | 15  | 51 | 135,400 | 134 | 18,700 | 165,200 | 740 | 5,100 |
| C20 | 4:1 | 21  | 40 | 165,100 | 84  | 25,900 | 183,000 | 710 | 4,900 |
| C21 | 5:1 | 26  | 32 | 201,400 | 58  | 33,100 | 197,000 | 730 | 4,700 |
| C22 | 6:1 | 30  | 29 | 245,700 | 43  | 40,200 | 208,400 | 750 | 4,600 |
| C23 | 7:1 | 34  | 28 | 294,800 | 34  | 47,400 | 218,000 | 740 | 4,500 |

TABLE 5-continued

Film Haze and Gloss vs. Density and MI$_2$ at Maximum Draw-down Ratios

| Ex. No. | Density g/cc | MI$_2$ dg/min | Film Process | MDO Maximum Draw-Down Ratio | Gloss % | Haze % |
|---|---|---|---|---|---|---|
| C23 | 0.940 | 0.057 | In-pocket | 7:1 | 34 | 28 |
| C24 | 0.959 | 0.057 | High-stalk | 11.6:1 | 29 | 37 |
| C25 | 0.949 | 0.075 | High-stalk | 11.9:1 | 32 | 37 |
| C26 | 0.949 | 0.057 | High-stalk | 10.6:1 | 30 | 40 |

I claim:

1. A method comprising:
   (a) converting a polyethylene resin into a film by a high-stalk blown extrusion process, wherein the polyethylene resin has a density within the range of 0.935 to 0.948 g/cc and an MI$_2$ within the range of 0.08 to 0.15 dg/min; and
   (b) orienting the film of step (a) uniaxially in the machine direction; wherein the oriented film has a haze of 20% or less.

2. The method of claim 1 wherein the polyethylene resin has a density within the range of 0.939 to 0.945 g/cc.

3. The method of claim 1 wherein the polyethylene resin has a density within the range of 0.939 to 0.941 g/cc.

4. The method of claim 1 wherein the polyethylene resin has an MI$_2$ is within the range of 0.10 to 0.15 dg/min.

5. The method of claim 1 wherein the oriented film has a haze of 15% or less.

6. The method of claim 1 wherein the film is uniaxially oriented in the machine direction with a draw-down ratio of 5:1 or greater.

7. The method of claim 6 wherein the draw-down ratio is 6:1 or greater.

8. The method of claim 2 wherein the oriented film has a gloss of 40% or greater.

9. The method of claim 8 wherein the oriented film has a gloss of 50% or greater.

* * * * *